Figure 1:
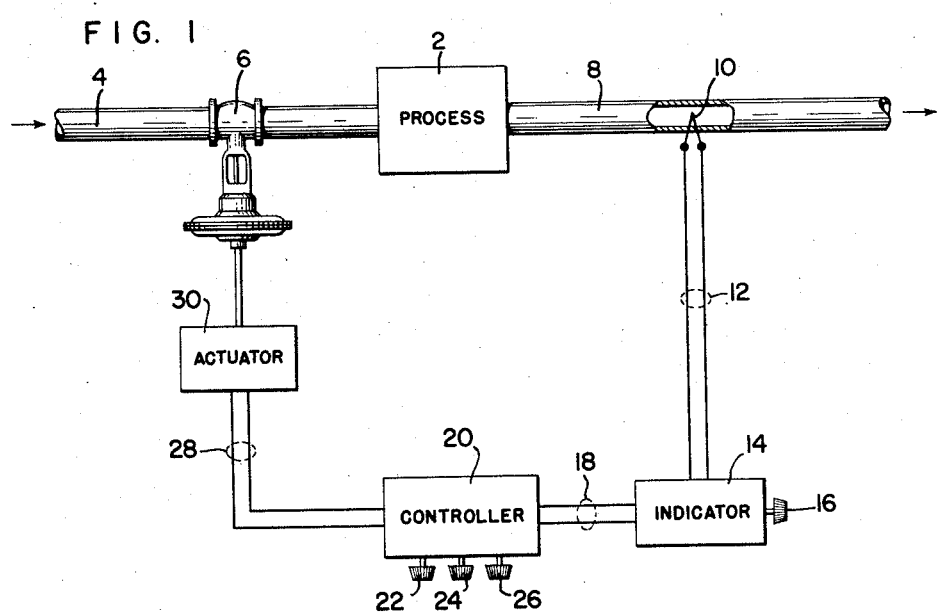

Oct. 27, 1959  J. A. BARING ET AL  2,910,585
CONTROL APPARATUS
Filed Nov. 14, 1956  2 Sheets-Sheet 1

INVENTORS.
JOHN A. BARING
BY WILLIAM J. POPOWSKY

ATTORNEY.

INVENTORS.
JOHN A. BARING
WILLIAM J. POPOWSKY
BY
ATTORNEY.

United States Patent Office 2,910,585
Patented Oct. 27, 1959

2,910,585

CONTROL APPARATUS

John A. Baring, Hatboro, and William J. Popowsky, Philadelphia, Pa., assignors to Minneapolis-Honeywell Regulator Company, Minneapolis, Minn., a corporation of Delaware Application November 14, 1956, Serial No. 622,113

10 Claims. (Cl. 250—27)

This invention relates to control apparatus, and more particularly to an electronic circuit for producing an output control signal which is a function of the deviation of a process variable from a predetermined value.

In the art relating to control apparatus, there have been provided, heretofore, various types of controllers. Many of these have included movable mechanical parts as elements thereof. Others, while electric in operation, have presented various shortcomings which have limited their applicability.

For example, it is advantageous to be able to accept direct current signals as indications of the relative condition of a process variable. Spurious alternating signals could be rendered of no effect in such a system, thus eliminating at least one cause of erroneous control action. An additional advantage of the direct current controller lies in the fact that such controllers can be connected in tandem or cascade, as is frequently found desirable, without the necessary added expense of interposed signal converters. Further, in controllers capable of three-mode operation (rate, proportional band, and reset), it is desirable that the rate function circuit elements precede, in point of time, the proportional band and reset functions. Such an arrangement prevents overshoot of the controlled process beyond the desired set point in that the rate section is permitted to provide an anticipation signal to prevent the overshoot, whereas controller saturation would prevent such anticipation if the rate section were subsequent in point of time.

It is, accordingly, an object of the present invention to provide an improved electronic controller which obviates the foregoing shortcomings.

It is another object of this invention to provide an improved electronic recorder which features three mode operation. That is, the controller output includes a rate function, a proportional band function, and a reset function.

It is a further object of this invention to provide an improved controller as set forth wherein the rate function precedes the proportional band and reset functions.

It is yet another object of the present invention to provide an improved controller of the type set forth which features a direct current electrical input as well as a continuous direct current electrical output signal and which is accurate and reliable in operation.

In accomplishing these and other objects, there has been provided, in accordance with the present invention, an electronic controller circuit in which the error signal is applied first to a differentiating rate circuit, then to the proportional band and reset circuit. This latter circuit includes a capacitive signal divider or balancing network which is coupled between the circuit input and the circuit output and feeds an amplifier stage the output signal of which is proportional to the error signal applied. A second capacitive signal divider is coupled in parallel with the first mentioned divider and feeds a stabilized D.C. amplifier the output of which corresponds to the time integral function of the error signal applied. The output integral function signal is applied, in superimposed relationship to the previously mentioned signal, to the input of the first mentioned amplifier stage.

Figure 2:
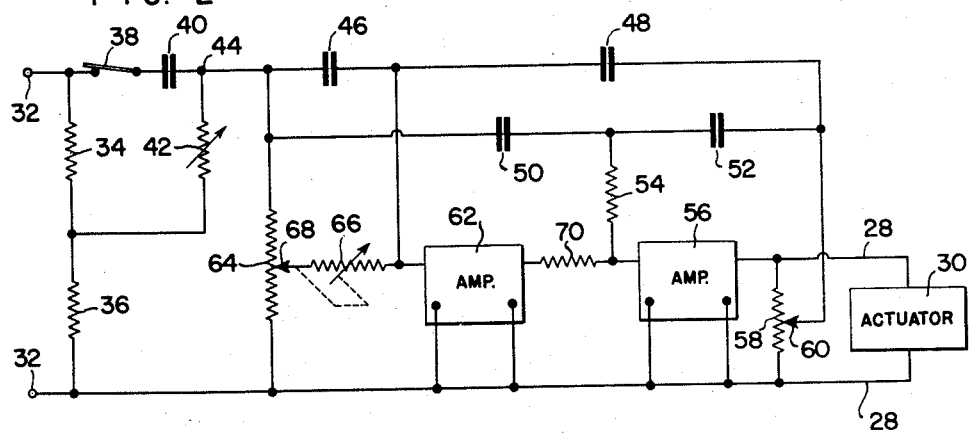
Figure 3:
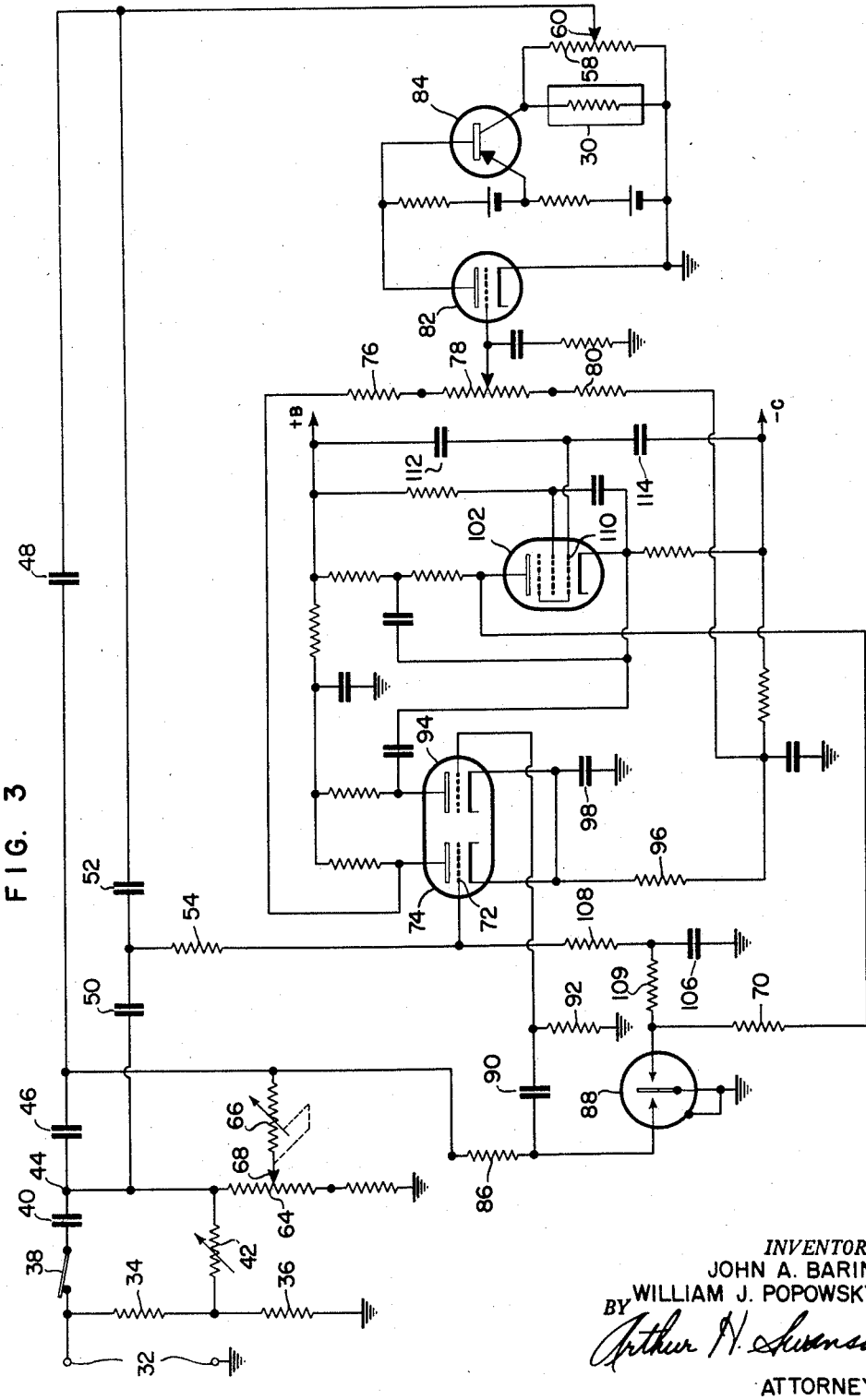

A better understanding of this invention may be had from the following detailed description when read in connection with the accompanying drawing, in which:

Figure 1 is a schematic representation of a system which may incorporate a controller constructed in accordance with the present invention, Figure 2 is a schematic diagram of a controller embodying the present invention, and Figure 3 is a circuit diagram showing one set of circuit elements combined to produce a controller according to the present invention.

Referring now to the drawing in more detail, there is shown in Figure 1 a representation of a process which is carried on under the control of a controller embodying the present invention. This system may include a process station 2 which may, for example, be a processing furnace. In accordance with this example there is, supplying fuel to the furnace, a supply line 4. The amount of fuel supplied to the furnace through the line 4 may be varied by a suitable variable valve 6. The output from the process stage 2 may include a pipe 8 which carries the material that was operated upon in the process stage 2. This pipe 8 may, by way of example, carry steam which is to be used elsewhere subsequently. The condition of the material in the pipe 8 is measured. In keeping with the example heretofore established, the condition may well be the temperature of the steam in the pipe 8. This temperature may be measured by the measuring element represented in the drawing by a thermocouple and transmitter 10. The signal generated by the transmitter 10 is fed over leads 12 to a suitable indicator 14. The indicator 14 preferably includes means for establishing a desired level or set point. The signal from the transmitter 10 is compared with the set point in the indicator 14. If there is a deviation, then an error signal is transmitted over leads 18 to the controller 20. As aforesaid, the controller produces an output signal which includes a rate function, a proportional band function, and a reset function. It will be appreciated that from time to time the various ratios of the several functions must needs be varied. Accordingly, suitable control members such as knobs 22, 24, and 26 are provided for accomplishing the variations to the several function controls. Continuing our example, the output signal from the controller is applied, through the leads 28, to a suitable valve actuator 30. The valve actuator controls the opening and closing of the valve 6 in accordance with the signal applied thereto from the controller 20. Thus, the valve 6 is operated to control the input to the process stage in a manner determined by the controller 20 to render the output of the process substantially constant.

In Figure 2 there is shown, schematically, a circuit arrangement for a controller embodying the present invention. This circuit includes a pair of input terminals 32 to which may be applied an error signal, for example, such as may be supplied by the indicator 14 shown in Figure 1. A pair of series connected resistors 34 and 36, respectively, is connected between the input terminals 32. To the upper end of the resistor 34 there is connected, through a switch 38, one electrode of a capacitor 40. The other electrode of the capacitor 40 is connected, through a variable resistor 42, to the junction between the resistors 34 and 36. The portion of the circuit thus far described is a differentiating rate function circuit the output terminal of which is located at the junction 44 between the capacitor 40 and the variable resistor 42.

Connected to this output terminal 44 is a capacitive signal dividing or balancing network which includes a first capacitor 46 and a second capacitor 48. Connected in parallel with these capacitors is a further capacitive signal divider or balancing network which includes a capacitor 50 and a capacitor 52. The values of these capacitors are so chosen that the ratio of the capacitance of capacitor 50 to that of capacitor 52 equals the ratio of the capacitance of capacitor 46 to that of capacitor 48.

Connected to the junction between the capacitors 50 and 52, there is a coupling or summing resistor 54 which connects the signal divider to an amplifier 56. This amplifier is of a fast response type which closely follows any signal applied thereto. The output of the amplifier 56 is applied across a load resistor 58 which is arranged in the form of a potentiometer. The potentiometer has a movable tap 60 which is connected to the junction between the capacitors 52 and 48.

The junction between the capacitors 46 and 48 is connected directly to the input of an amplifier 62. The output terminal 44 of the rate circuit is also connected through a potentiometer 64 and a variable resistor 66 to the input of the amplifier 62. The movable tap 68 on the potentiometer 64 is ganged with the variable resistor 66 so that the two are operated simultaneously. The output of the amplifier 62 is connected through a coupling resistor 70 to the input of the amplifier 56. The amplifier 62 is preferably of the chopper stabilized type. This type of amplifier includes certain inherent delays in signal response.

In operation, let us assume that a sudden change in the conditions relating to the material under control produces a step function signal which appears at the input terminals 32 of the controller. This is a current signal and is passed through the resistors 34 and 36 to produce a corresponding voltage signal. This voltage signal is applied to the capacitor 40 which passes the initial signal allowing the voltage signal to appear at the terminal 44. The signal at the terminal 44 then decays through the resistor 42 and the resistor 36 to the level whereat the signal on the terminal 44 bears the same proportionate ratio to the original signal as the ratio of the resistance of the two resistors 36 and 34, respectively.

As the initial signal appears at the terminal 44, this signal is applied, by the respective coupling circuits, to the inputs of the two amplifiers 56 and 62. Inasmuch as the amplifier 62 is a slow acting amplifier, the effect of the initial signal is not immediately felt in the output of that amplifier. However, the amplifier 56 is a fast responding amplifier and will follow the change in the incoming signal. It will be appreciated that both amplifiers 56 and 62 are moderately high gain amplifiers. As previously mentioned, the output of the amplifier 56 is applied to the load resistor 58. This application of the output to the load resistor 58 causes a corresponding change in the current flow through that load resistor producing a corresponding change in the voltage drop thereacross. A portion of the voltage signal appearing across the resistor 58 is picked off by the tap 60 and applied, as negative feedback, through the capacitor 52 and a coupling resistor 54, to the input of the amplifier 56. The direction of the change in the current flow through the resistor 58 is such as to cause a voltage signal applied across the capacitor 52 to oppose that applied across the capacitor 50, thus neutralizing or balancing the signal applied to the input of the amplifier 56. The magnitude of the change in the current flowing through the resistor 58 necessary to produce the neutralization of the input signal depends first upon the magnitude of the applied signal and second to the setting of the movable tap 60 along the resistor 58. For any fixed position of the movable tap 60, the change in current through the resistor 58 is proportional to the magnitude of the applied signal. Hence, the adjustment of the movable tap 60 constitutes a proportional band adjustment. The signal appearing across the resistor 58 may then be applied, as was discussed in the previous figure, over leads 28 to a suitable actuator 30. The portion of the circuit thus far described constitutes a rate function and a proportional band function output.

The potentiometer 64 and the variable resistor 66 in combination with the capacitor 48 constitute an integrating circuit for the signal applied to the input of the stabilized amplifier 62. The time integral of the signal appearing at the terminal 44 when applied to the input of the stabilized amplifier constitutes a reset function. The output of this amplifier 62 when applied through the resistor 70 to the input of the amplifier 56 superimposes its signal upon that applied to the amplifier 56 with the net result that the current change developed in the resistor 58 includes a rate function, a proportional band function, and a reset function. The portion of the output signal which is fed back through the movale tap 60 is also applied in a direction such that the signal developed across the capacitor 48 is opposed to and neutralizes the signal developed across the capacitor 46. Since both the amplifier 62 and the amplifier 56 are moderately high gain amplifiers, the overall circuit is extremely sensitive to variations in the input signal.

In Figure 3 there is shown, schematically, a diagram of a circuit which was constructed and operated in accordance with the present invention. The circuit elements which are individually identified in Figure 2 are similarly identified in Figure 3. Thus, a pair of voltage dividing resistors 34 and 36 are connected across a pair of input terminals 32. One electrode of the capacitor 40 is connected through the switch 38 to the upper end of the resistor 34. The other electrode of the capacitor 40 is connected through a variable resistor 42 to the junction between the two resistors 34 and 36. Again, the junction between the capacitor 40 and the resistor 42 constitutes an output terminal 44 for the rate function circuit.

Connected to this terminal 44 is a capacitive signal divider or balancing network which includes the capacitor 46 and the capacitor 48. As before, a second capacitive divider or balancing network is connected in parallel with the first mentioned capacitive network. This network includes the capacitors 50 and 52, respectively. The junction between the capacitors 50 and 52 is connected through a coupling resistor 54 to the control grid 72 of the amplifier tube 74. The tube 74 comprises a first stage of the fast response amplifier represented by the amplifier 56 shown in Figure 2. The outputs of the amplifier tube 74 is coupled through suitable coupling and balancing resistors 76, 78, and 80 to the input of a power amplifier which includes a driver tube 82 and a power amplifying transistor 84. As before, a change in the output of the transistor amplifier 84 causes a corresponding change in the current flowing through the load resistor 58. The portion of the voltage signal developed across the load resistor 58 is coupled through the movable tap 60 as feedback across the capacitor 52 to the input of the amplifier tube 74.

The junction between the capacitors 46 and 48 is connected, through a coupling resistor 86, to one electrode of a signal chopper 88. The chopper connects the aforementioned electrode periodically to ground, thus converting the input signal from a D.C. signal to a pulsating or A.C. signal which is applied across a coupling capacitor 90 and the grid resistor 92, to the input of an A.C. amplifier 94. It may be noted that the amplifier 74 and the amplifier 94 constitute a pair of differentially coupled amplifier tubes having a common cathode impedance which includes the cathode resistor 96 and an A.C. bypass capacitor 98. The two tubes 74 and 94 being included in the same envelope will have substantially identical drift characteristics. The differential coupling provides for a substantial neutralization of the effects of any such drift since the output signal is a function of the difference between the applied signal and the condition that exists when no signal is applied.

The output from the amplifier 94 is coupled to the input of a pentode amplifier 102. The input to the pentode 102 is connected in the cathode circuit thus obviating the usual phase inversion. The output from the pentode amplifier 102 is connected through the resistor 70 to the second contact on the chopper 88. This side of the chopper 88 acts as a synchronous rectifier reconverting the signal output from the pentode to a D.C. signal. This reconstituted D.C. signal is passed through a filter which includes resistors 109 and 108 and capacitor 106 thence to the input of the D.C. amplifier 74. An additional capacitive voltage divider is provided between the positive voltage supply lead and the negative voltage supply lead to form a point of reference potential for the control grid 110 of the pentode 102. This capacitive voltage divider includes a capacitor 112 and a capacitor 114 connected in series across the two voltage supply leads. The junction between these two capacitors is directly connected to the control grid of the pentode 102. This arrangement provides for a minimization of the effect of any variation in the power supply which would have been directly reflected in the output of the tube if the tube had been connected in the conventional grounded grid manner.

Again, as described with respect to the previous drawing, the output of the power amplifier 84, which is reflected as a voltage signal across the load resistor 58, is partially fed back to the input of the stabilized amplifier across the capacitor 48, tending to balance or reduce to zero the input signal appearing across the capacitor 46. Here, too, the potentiometer 64 with its movable tap 68 and the variable resistor 66, when combined in the circuit with the capacitor 48, constitutes an integrating circuit for the signals applied to the input circuit of the amplifier 94. This circuit operates in the manner described in connection with Figure 2 for the provision of an output signal which includes a rate function, a proportional band function, and a reset function. The variable resistor 42 may be varied as aforesaid to provide a variation in the rate function. The potentiometer 64 ganged with the variable resistor 66 may be varied in order to produce a variation in the reset function. The variable tap 60 on the load resistor 58 may be varied to produce a variation in the proportional band function.

When the process represented in Fig. 1 is first put into operation, there will be a large difference between the measured process variable and that established by the set-point value. In this condition there will be a very large initial error signal applied to the input of the controller circuit. Under such conditions, it is desirable to be able to remove the rate function from the circuit before initiating operation of the system. To this end, the switch 38 has been provided. With the switch 38 open, the capacitor 40 is removed from the circuit. The voltage signal appearing at the terminal 44 will be the voltage signal developed across the resistor 36. After the system has approached its proper operating condition, the switch 38 may be closed and the rate function circuit permitted to enter the over-all control consideration.

Thus, it may be seen that there has been provided an improved electronic controller which includes three mode operation with the rate function preceding the proportional band and reset functions, which has a direct current electrical input as well as a direct current output and which is accurate, reliable, and continuous in operation.

Having now described our invention, what we claim as new and desire to secure by Letters Patent is as follows:

1. An electronic controller comprising, in combination, signal input means for receiving a variable direct current input signal, a differentiating circuit coupled to said input means for producing a signal proportional to the rate function of said input signal, a first amplifier having an input circuit and an output circuit, a capacitive balancing means coupled between said amplifier output circuit and said differentiating circuit, means coupling said balancing means to said amplifier input circuit, said output circuit being arranged to produce a direct current signal proportional to the signal applied to said first amplifier, a second amplifier having an input circuit and an output circuit, a second capacitive balancing means connected in parallel with the first mentioned balancing means, means including a signal integrating means coupling said second capacitive balancing means to said input circuit of said second amplifier, and means coupling said output circuit of said second amplifier to the input circuit of said first amplifier.

2. An electronic controller comprising, in combination, signal input means for receiving a variable direct current input signal, a differentiating circuit coupled to said input means for producing a signal proportional to the rate function of said input signal, a first amplifier having an input circuit and an output circuit, said amplifier being arranged to respond rapidly to applied direct current signals, a capacitive signal balancing means coupled between said output circuit and said differentiating circuit, means coupling the output of said balancing means to said amplifier input circuit, said output circuit of said first amplifier being arranged to produce a direct current signal proportional to the magnitude of the signal applied to the input circuit of said first amplifier, a second amplifier having an input circuit and an output circuit, a second capacitive balancing means connected in parallel with said first mentioned balancing means, means including a signal integrating circuit coupling the output of said second balancing means to the input circuit of said second amplifier, and means coupling said output circuit of said second amplifier to the input circuit of said first amplifier in superimposed relationship with the aforementioned signals applied to said input circuit of said first amplifier whereby said first amplifier output includes a rate function, a proportional band function and a time integral or reset function.

3. An electronic controller comprising, in combination, signal input means for receiving a variable direct current input signal, a differentiating network coupled to said input means for producing a signal proportional to the rate function of said input signal, a first amplifier having an input circuit and an output circuit, said amplifier being arranged to respond rapidly to applied direct current signals, a capacitive balancing network including a pair of series connected capacitors connected between said amplifier output circuit and said differentiating circuit, means coupling the junction between said capacitors to the input circuit of said first amplifier, said output circuit including means for developing a signal proportional to the magnitude of the signals applied to the input of said first amplifier, a second amplifier having an input circuit and an output circuit, a second capacitive balancing network including a second pair of series connected capacitors connected in parallel with said first mentioned balancing network, means including a signal integrating circuit coupling the output of said second balancing means to the input circuit of said second amplifier, and means coupling the output circuit of said second amplifier to the input circuit of said first amplifier whereby to apply the output signal of said second amplifier in superimposed relationship to the aforementioned signals applied to said input circuit of said first amplifier whereby said first amplifier output includes a rate function, a proportional band function, and a time integral or reset function.

4. An electronic controller comprising, in combination, signal input means for receiving a variable direct current input signal, a differentiating network coupled to said input means for producing a signal proportional to the rate function of said input signal, means for varying the time constant of said differentiating network, a first amplifier having an input circuit and an output circuit, said amplifier being arranged to respond rapidly to applied direct current signals, a capacitive balancing network including a pair of series connected capacitors coupled between said first amplifier output circuit and said differentiating circuit, means coupling the junction between said series connected capacitors to said first amplifier input circuit, said capacitive balancing network including a negaitve feed-back coupling for said first amplifier, said output circuit including means for developing a signal proportional to the magnitude of the signal applied to the input circuit of said first amplifier, a second amplifier having an input circuit and an output circuit, a second capacitive balancing network including a second pair of series connected capacitors connected in parallel with said first mentioned balancing network, means including a signal integrating circuit coupling the output of said second balancing network to the input circuit of said second amplifier, and means coupling the output circuit of said second amplifier to the input circuit of said first amplifier whereby to apply the output signal of said second amplifier in superimposed relationship with the aforementioned signals to said input circuit of said first amplifier whereby said first amplifier output includes a rate function, a proportional band function and a time integral or reset function.

5. An electronic controller comprising, in combination, signal input means for receiving a variable direct current input signal, a differentiating network coupled to said input means for producing a signal proportional to the rate function of said input signal, means for varying the time constant of said differentiating network, a first amplifier having an input circuit and an output circuit, said amplifier being arranged to respond rapidly to applied direct current signals, a capacitive balancing network including a pair of series connected capacitors coupled between said first amplifier output circuit and said differentiating circuit, means coupling the junction between said series connected capacitors to said first amplifier input circuit, said capacitive balancing network including a negative feedback coupling for said first amplifier, said output circuit including means for developing a signal proportional to the magnitude of the signal applied to the input of said first amplifier, a second amplifier having an input circuit and an output circuit, a second capacitive balancing network including a second pair of series connected capacitors connected in parallel with said first mentioned balancing network, means including a signal integrating circuit coupling the output of said second balancing network to the input circuit of said second amplifier, means for varying the time constant of said integrating circuit, and means coupling the output circuit of said second amplifier to said input circuit of said first amplifier whereby to apply output signals from said second amplifier in superimposed relationship with the aforementioned signals to said input circuit of said first amplifier whereby said first amplifier output includes a variable rate function, a proportional band function and a variable time integral or reset funciton.

6. An electronic controller comprising, in combination, signal input means for receiving a variable direct current input signal, a differentiating network coupled to said signal input means for producing a signal proportional to the rate function of said input signal, a first amplifier having an input circuit and an output circuit, a second amplifier having an input circuit and an output circuit, means coupling the output of said differentiating network to said input circuit of said first amplifier, said output circuit of said first amplifier including means for developing a signal proportional to the magnitude of the signal applied to said first amplifier input circuit, means including a signal integrating means for coupling the output of said differentiating network to said input circuit of said second amplifier, and means for coupling the output of said second amplifier to said input circuit of said first amplifier.

7. An electronic controller comprising, in combination, signal input means for receiving a variable direct current input signal, a differentiating network coupled to said signal input means for producing a signal proportional to the rate function of said input signal, a first amplifier having an input circuit and an output circuit, a second amplifier having an input circuit and an output circuit, means coupling the output of said differentiating network to said input circuit of said first amplifier, said output circuit of said first amplifier including means for developing a signal proportional to the magnitude of signals applied to said first amplifier input circuit, means coupling said first amplifier output circuit to said first amplifier input circuit in negative feedback relationship, means including a signal integrating network for coupling the output of said differentiating network also to the input circuit of said second amplifier, means for coupling the output of said second amplifier to said input circuit of said first amplifier in superimposed relationship with the previously mentioned signals applied thereto, and negative feedback coupling means including said integrating network connecting said output circuit of said first amplifier and said input circuit of said second amplifier.

8. An electronic controller comprising, in combination, a pair of signal input terminals for receiving direct current input signals, a differentiating network including a pair of series connected resistors connected between said terminals for developing a voltage signal corresponding to said input direct current signal, a series connected capacitor and resistor connected in parallel with one of the resistors of said pair of series connected resistors, said differentiating network having an output connection at the junction between said series connected capacitor and resistor, a first amplifier having an input circuit and an output circuit, said first amplifier being arranged to respond rapidly to applied direct current signals, a capacitive balancing network including a pair of series connected capacitors coupled between said first amplifier output circuit and said output connection of said differentiating network, means coupling the junction between said series connected capacitors to said first amplifier input circuit, said capacitive balancing network including a negative feedback coupling between said first amplifier output circuit and said first amplifier input circuit, said first amplifier output circuit including means for developing an output signal proportional to the magnitude of the signals applied to the input of said first amplifier, a second amplifier having an input circuit and an output circuit, a second capacitive balancing network including a second pair of series connected capacitors connected in parallel with said first mentioned balancing network, means including a signal integrating circuit coupling the output of said second balancing network to said input circuit of said second amplifier, means coupling the output circuit of said second amplifier to said input circuit of said first amplifier whereby to apply output signals from said second amplifier to the input of said first amplifier in superimposed relationship with the previously mentioned signals applied thereto whereby said first amplifier output signal includes a rate function, a proportional band function and a time integral or reset function.

9. The invention as set forth in claim 8 wherein said second amplifier is a chopper stabilized amplifier, said second amplifier input circuit having chopper means for converting direct current input signals to alternating current signals, and said second amplifier output circuit includes means for converting alternating current output signal to direct current output signals.

10. An electronic controller comprising, in combination, a pair of signal input terminals for receiving direct current input signals, a differentiating network for producing a signal proportional to the rate function of said input signal, said differentiating network including a pair of series connected voltage dividing resistors connected between said pair of input terminals for developing a voltage signal proportional to said input direct current signal, a series connected capacitor and variable resistor connected in parallel with one of the resistors of said pair of series connected resistors, said variable resistor being operable to vary the time constant of said differentiating network, said differentiating network having an output connection at the junction between said capacitor and said variable resistor, a first amplifier having an input and an output, said first amplifier being arranged for rapid response to applied direct current signals, a capacitive balancing network including a pair of series connected capacitors coupled between said first amplifier output and said output connection of said differentiating network, means coupling the junction between said series connected capacitors to said first amplifier input, said first amplifier output including means for developing an output signal proportional to the magnitude of signals applied to said input of said first amplifier, means for varying said last mentioned means to vary the ratio of said proportional output, a second amplifier having an input and an output, a second capacitive balancing network including a pair of series connected capacitors connected in parallel with said first mentioned balancing network, means including a signal integrating circuit coupling the output of said second balancing network to said input of said second amplifier, means for varying the time constant of said integrating circuit, means coupling the output from said second amplifier to said input of said first amplifier whereby to apply output signals from said second amplifier to the input of said first amplifier in superimposed relationship with the previously mentioned signals applied thereto whereby said first amplifier output signal includes a variable rate function, a variable proportional band function and a variable time integral or reset function.

References Cited in the file of this patent

UNITED STATES PATENTS 2,498,759    Korman _____ Feb. 28, 1950